May 5, 1936.  A. P. JURGENSEN  2,039,425
MACHINE FOR MAKING SANITARY NAPKINS
Filed June 17, 1933  9 Sheets-Sheet 1
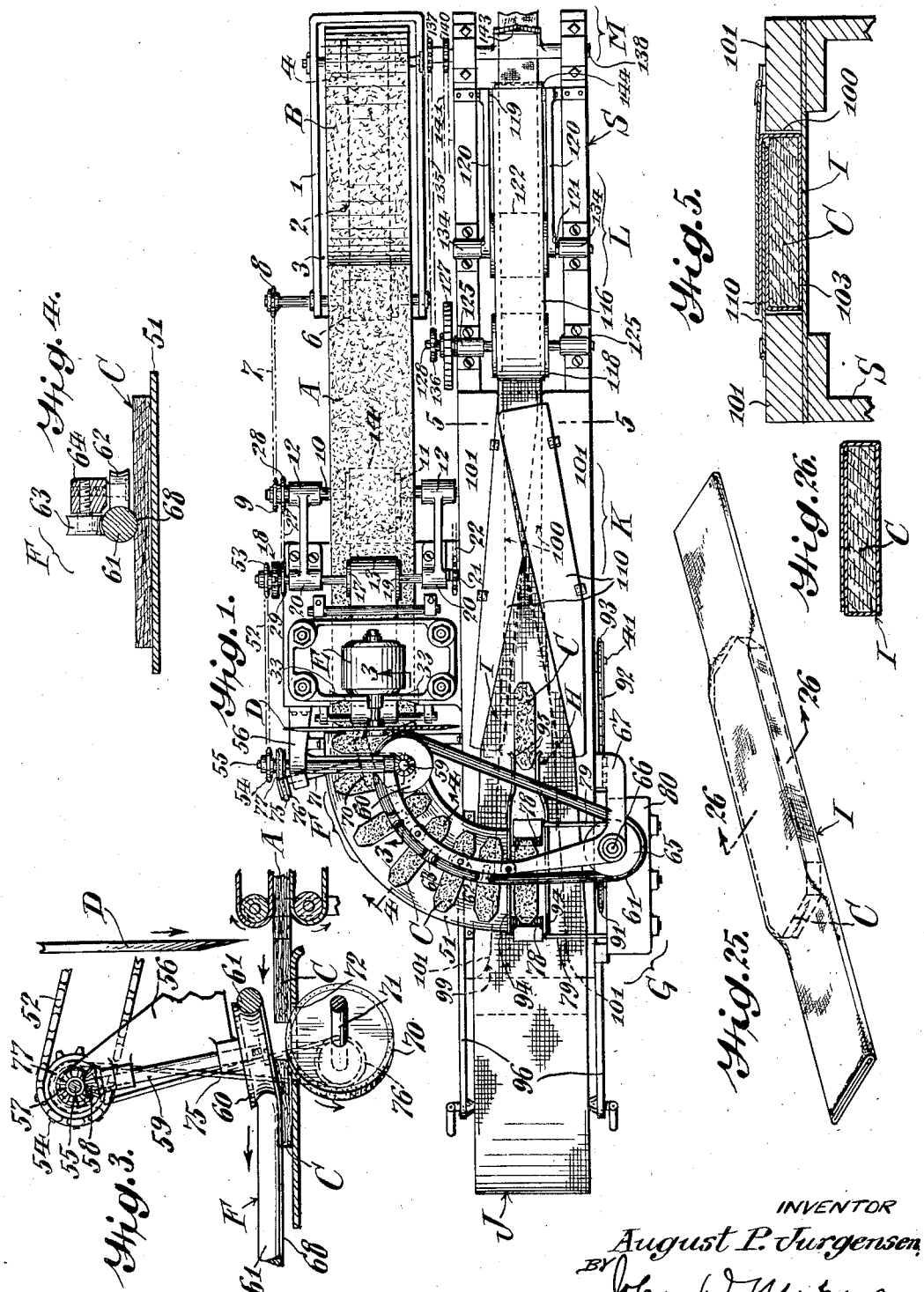
INVENTOR
August P. Jurgensen
BY John W. Myers
ATTORNEY

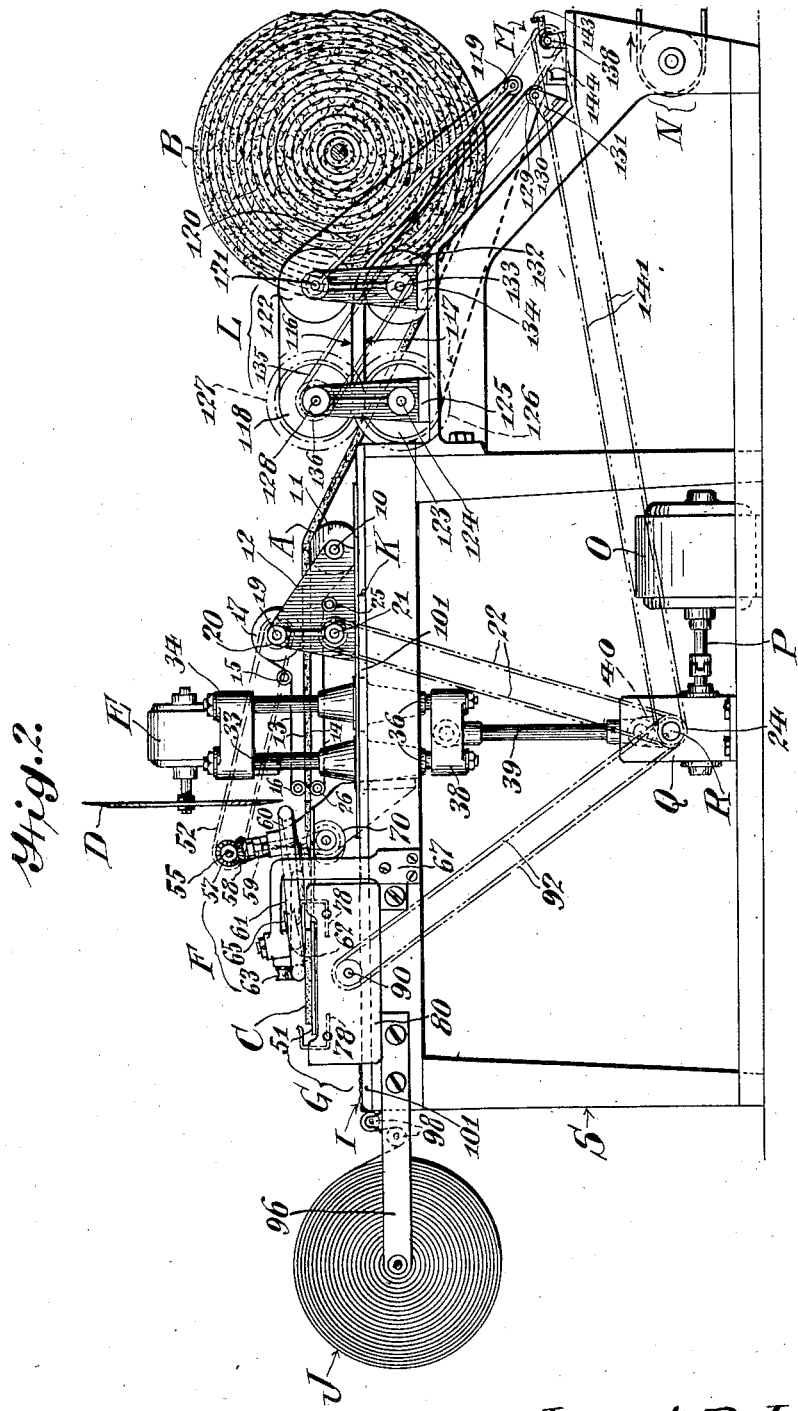

May 5, 1936.  A. P. JURGENSEN  2,039,425
MACHINE FOR MAKING SANITARY NAPKINS
Filed June 17, 1933   9 Sheets-Sheet 3
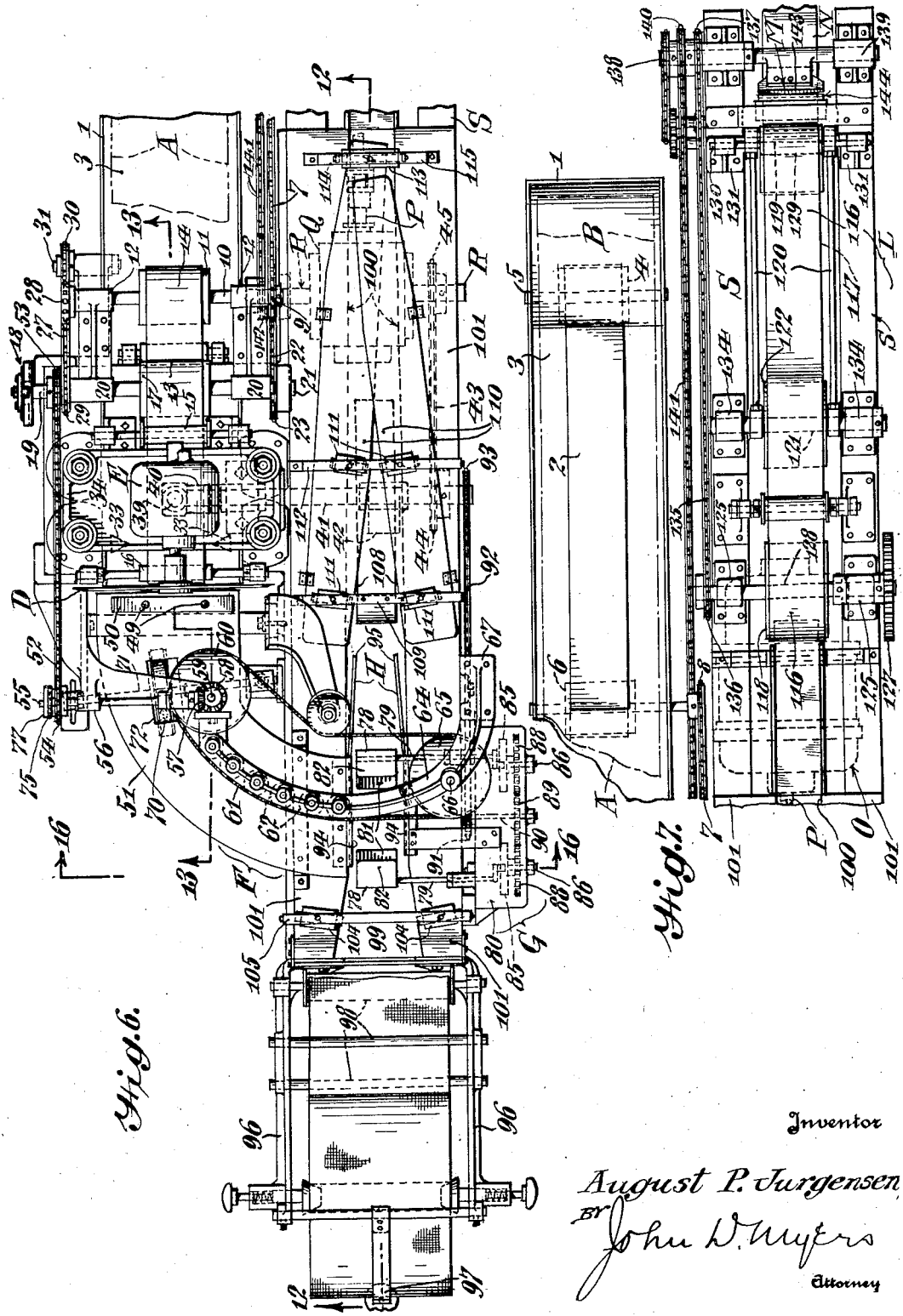
Inventor
August P. Jurgensen,
By John D. Myers
Attorney

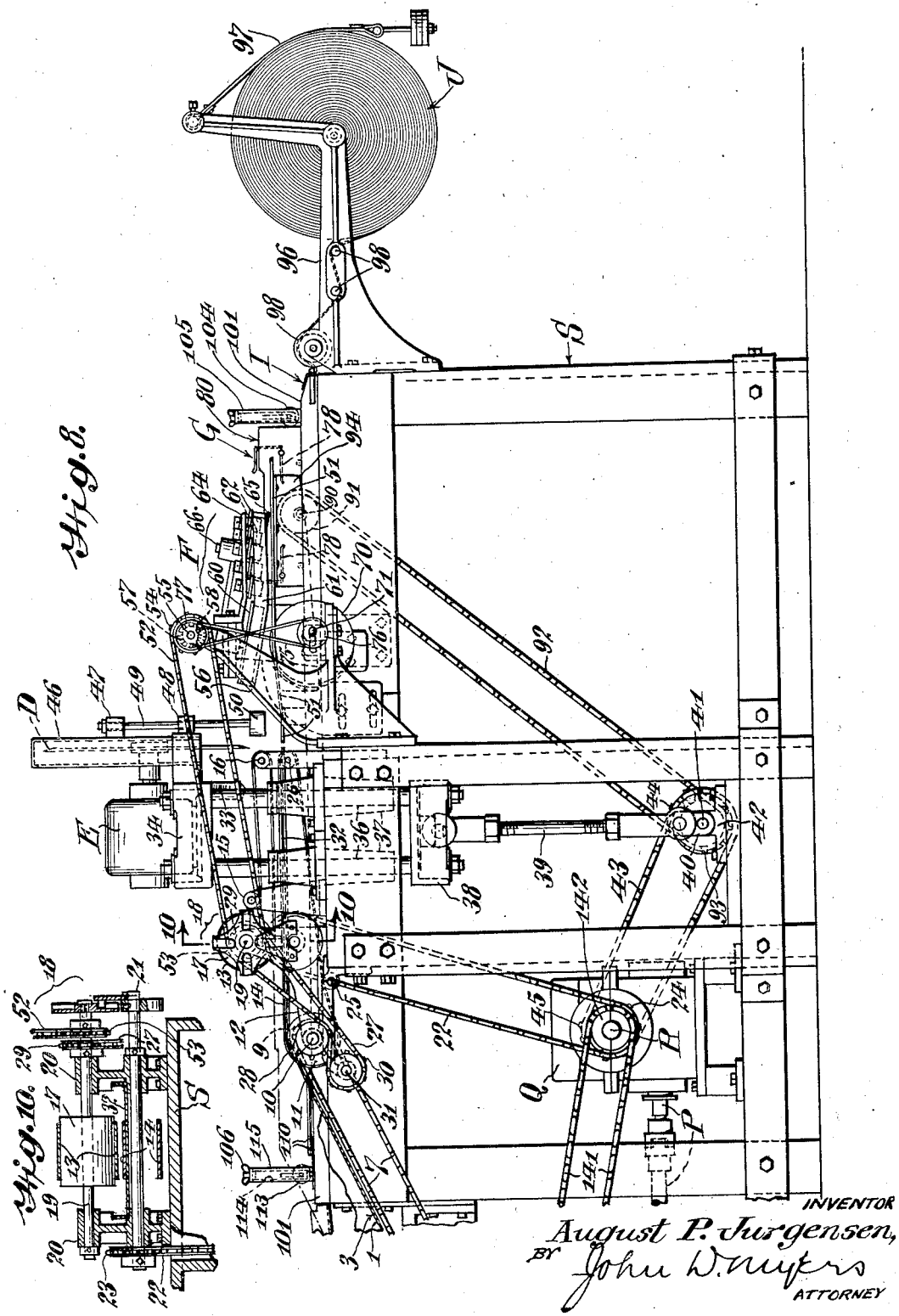

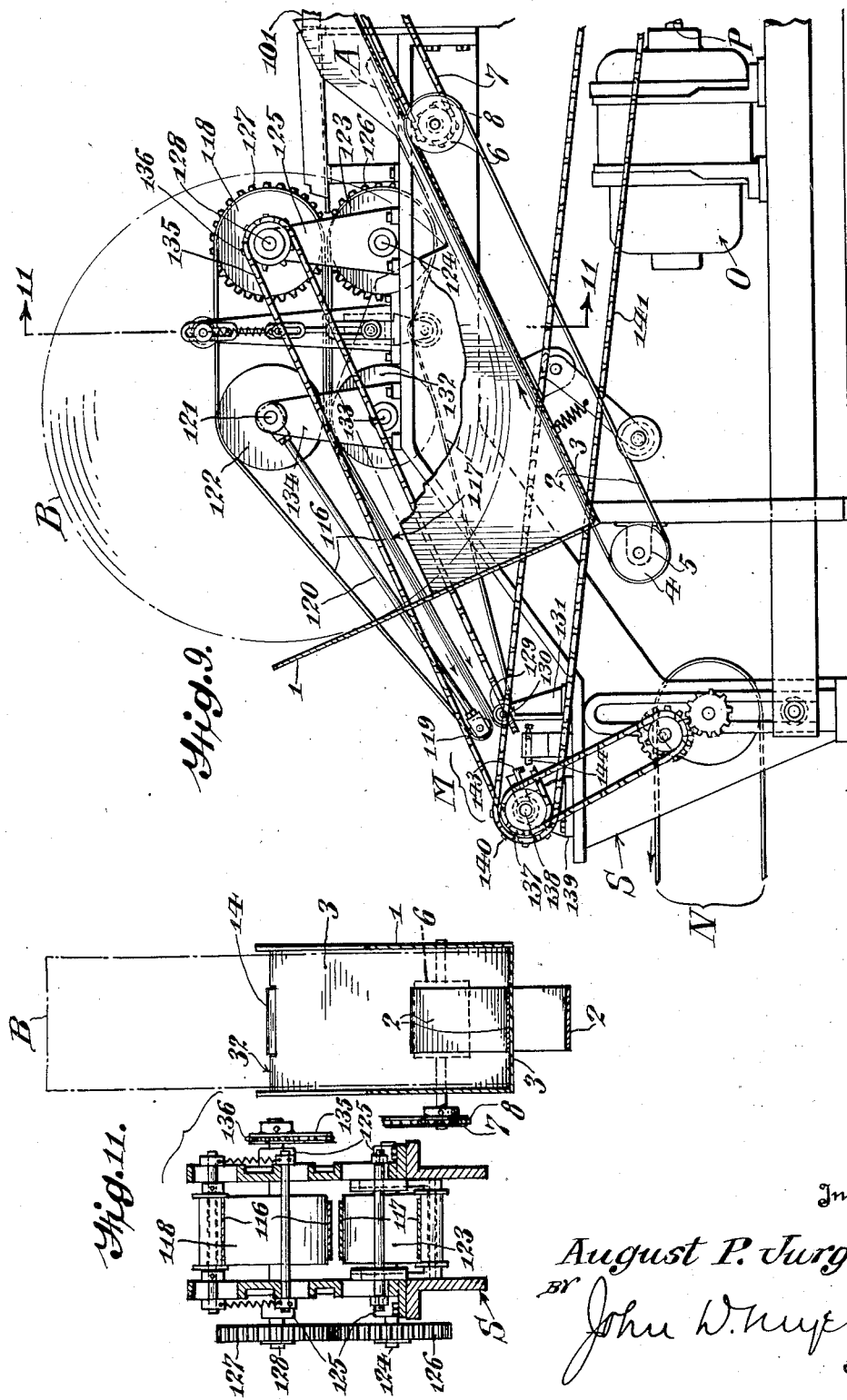

May 5, 1936. A. P. JURGENSEN 2,039,425
MACHINE FOR MAKING SANITARY NAPKINS
Filed June 17, 1933 9 Sheets-Sheet 6
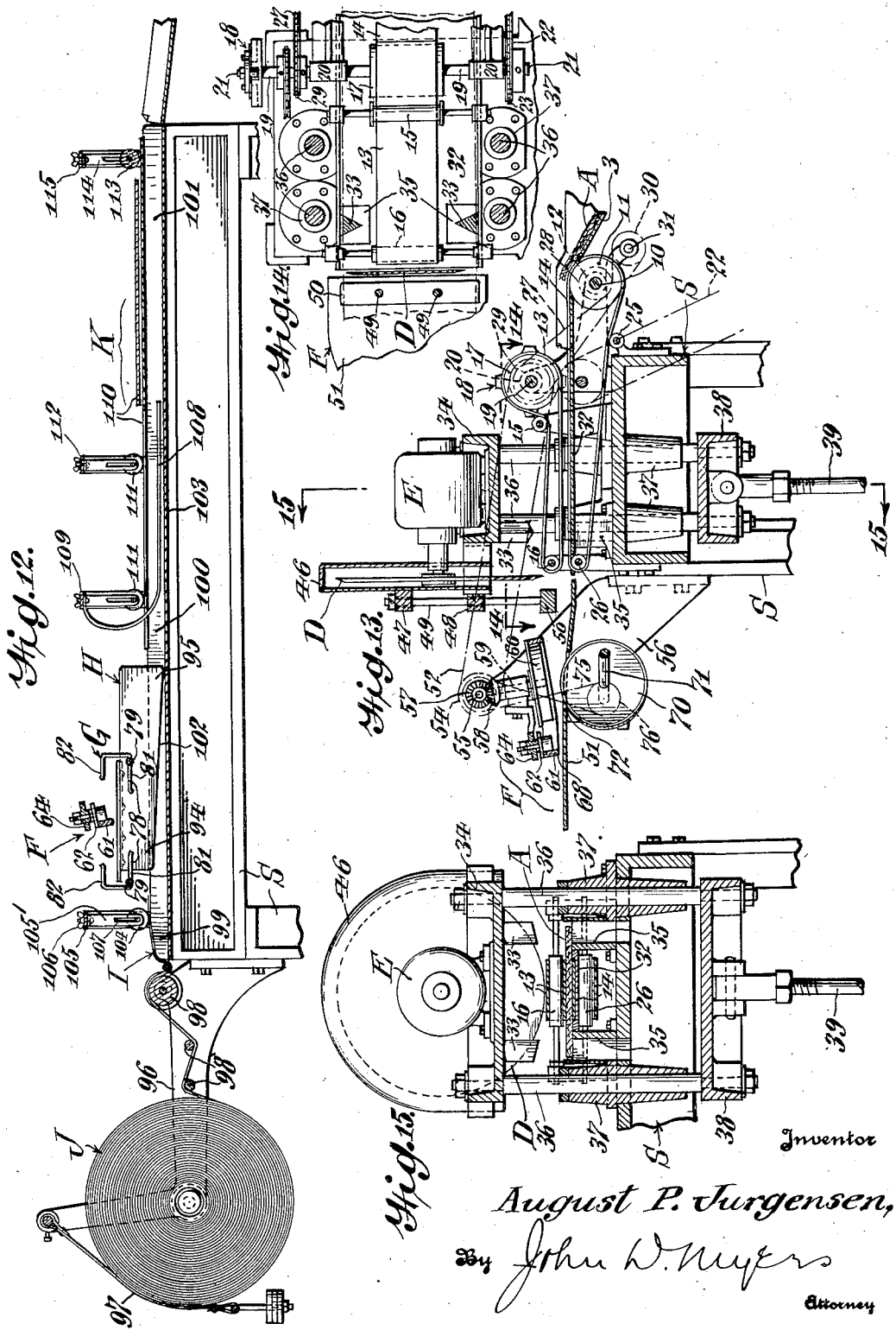
Inventor
August P. Jurgensen,
By John W. Myers
Attorney May 5, 1936.　　　　A. P. JURGENSEN　　　　2,039,425
MACHINE FOR MAKING SANITARY NAPKINS
Filed June 17, 1933　　　9 Sheets-Sheet 7

Inventor

August P. Jurgensen,

By John D. Myers
　　Attorney

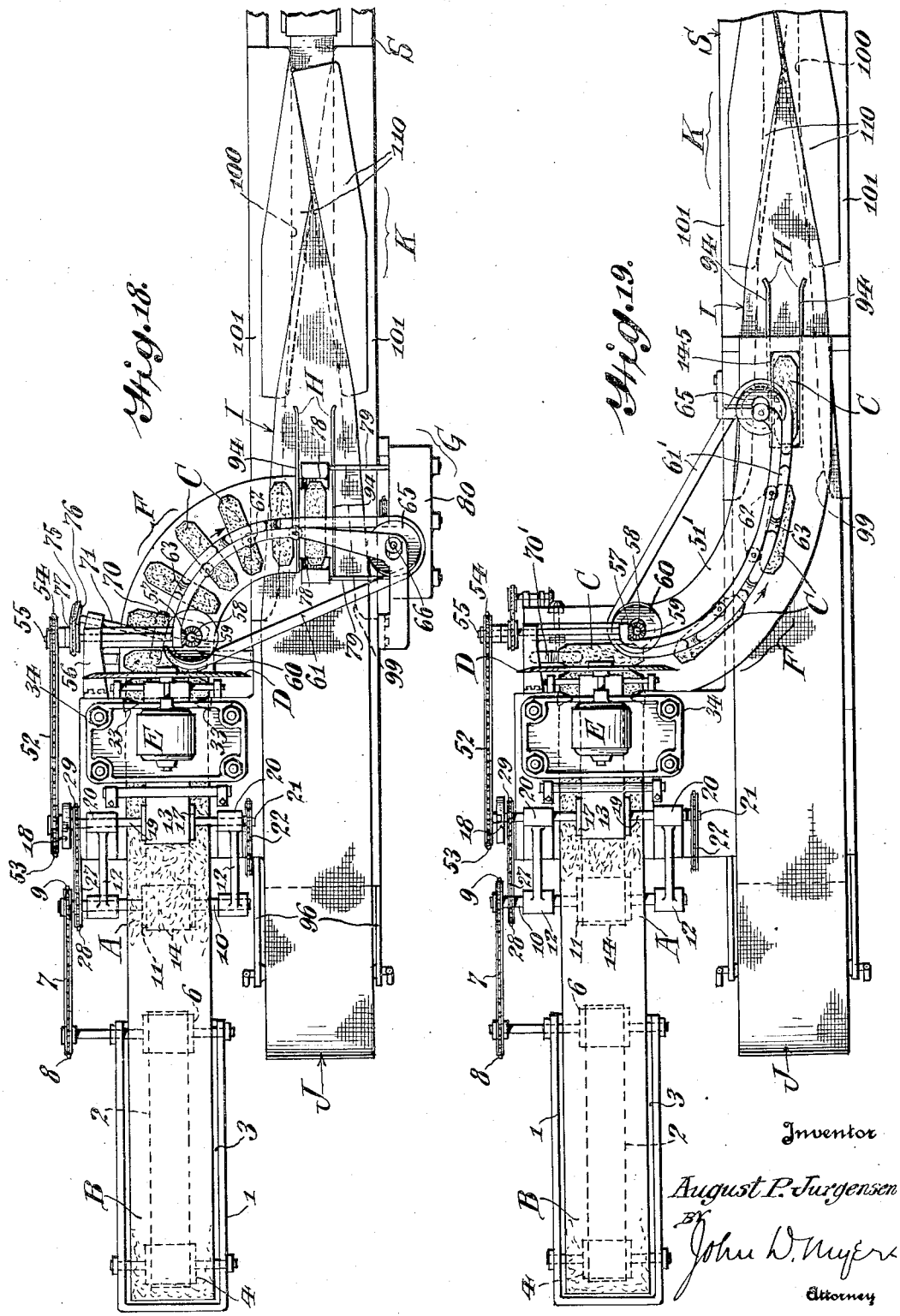

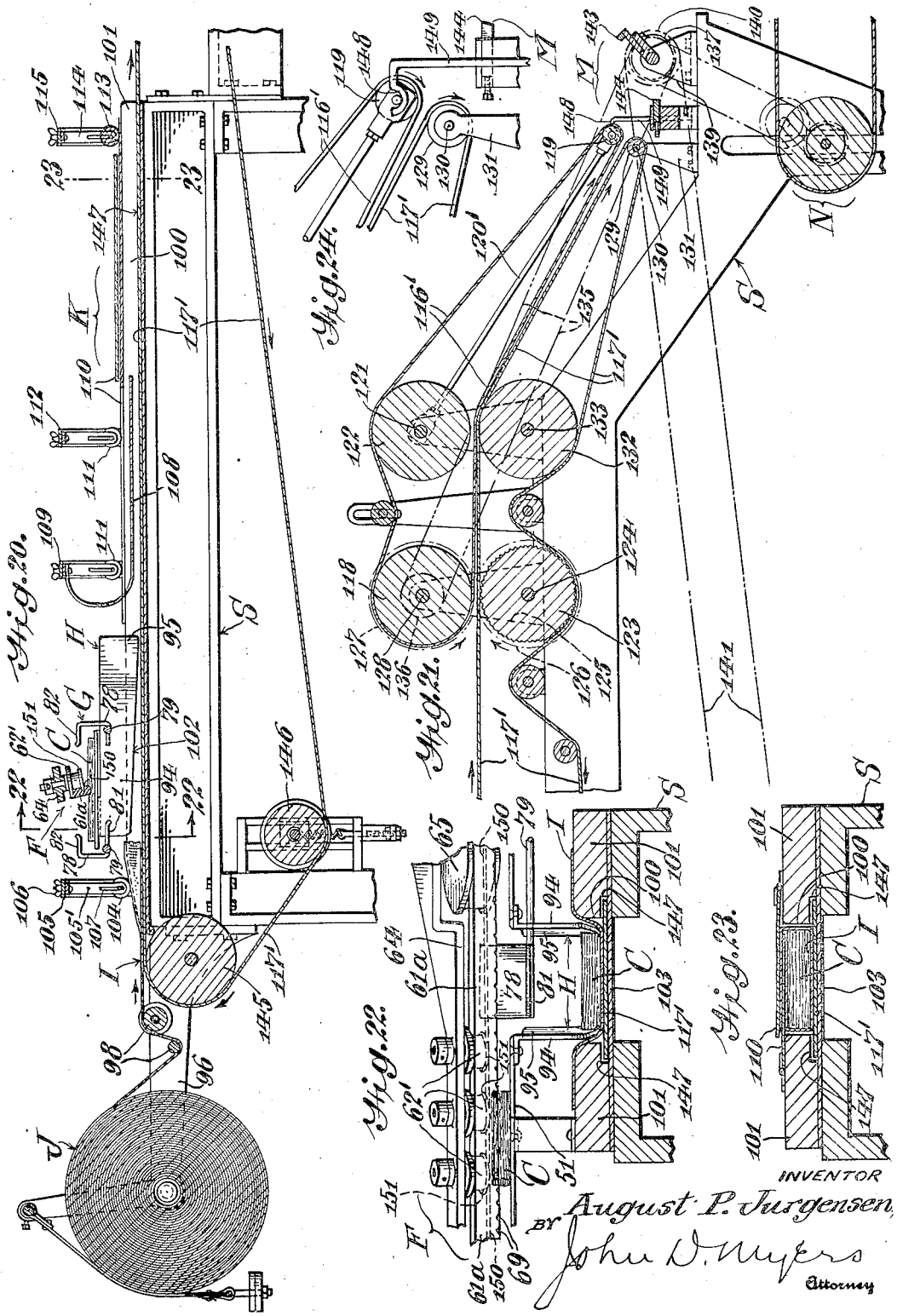

Patented May 5, 1936

2,039,425

UNITED STATES PATENT OFFICE 2,039,425

MACHINE FOR MAKING SANITARY NAPKINS

August P. Jurgensen, Atlantic City, N. J., assignor to The De Long Hook and Eye Company, a corporation of Pennsylvania Application June 17, 1933, Serial No. 676,343

20 Claims. (Cl. 154—29)

This invention involves a machine for making sanitary napkins and relates particularly to improvements in mechanism whereby elongated pads of absorbent material are severed from the forward end of a strip of absorbent material intermittently fed in a given direction, and are individually transferred to and deposited lengthwise of a strip of gauze continuously fed alongside the strip of absorbent material and in a direction opposite to the direction of movement of the strip of absorbent material.

One of the main objects of the invention is the combination and arrangement of the various mechanisms of a machine of this character in such a manner as to conserve space and to bring these mechanisms into the view of the operator. Another object of the invention is the provision, in a machine of this kind, of improved mechanism for conveying absorbent pads or the like from a remote position and depositing the same at spaced intervals on a strip of gauze. A further object of the invention is the provision, in a machine of this kind, of improved mechanism for conveying elongated pads of absorbent material or the like from one position to another position remote therefrom and at right angles thereto. A still further object of the invention is the provision, in a machine of this kind, of improved mechanism for conveying pads of absorbent material severed from the forwardly moving end of a strip of absorbent material and depositing the same at spaced intervals on a strip of gauze moving alongside the strip of absorbent material and in the opposite direction. A still further object of the invention is the provision, in such mechanism, of improved means for delivering the absorbent pads to the conveyor. A still further object of the invention is the provision, in such mechanism, of improved means for depositing the absorbent pads upon and lengthwise of a strip of gauze.

Still other objects and advantages of the improvements will be apparent from the following specification, and from the accompanying drawings wherein:

Fig. 1 is a diagrammatic plan view of a machine embodying the improvements and showing the manner in which absorbent pads are severed from the forward end of an intermittently fed strip of absorbent material, and conveyed singly to and deposited lengthwise upon a strip of gauze fed continuously in a direction opposite to the direction of movement of the strip of absorbent material;

Fig. 2 is a diagrammatic front elevation of the machine illustrated in Fig. 1;

Fig. 3 is a sectional view taken on the line 3—3 of Fig. 1, and showing the manner in which pads are severed from the strip of absorbent material and transferred to the conveyor mechanism;

Fig. 4 is a sectional view taken on the line 4—4 of Fig. 1;

Fig. 5 is a transverse sectional view taken on the line 5—5 of Fig. 1;

Figs. 6 and 7 are separated plan views of a machine with the improvements shown in detail thereon;

Figs. 8 and 9 are separated rear elevational views of the machine shown in Figs. 6 and 7;

Fig. 10 is a vertical sectional view taken on the line 10—10 of Fig. 8, and showing the intermittent motion mechanism;

Fig. 11 is a vertical sectional view of parts of the machine taken on the line 11—11 of Fig. 9;

Fig. 12 is a longitudinal sectional view of the machine taken on the line 12—12 of Fig. 6;

Fig. 13 is a vertical sectional view taken on the line 13—13 of Fig. 6;

Fig. 14 is a horizontal sectional view taken on the line 14—14 of Fig. 13;

Fig. 15 is a vertical sectional view taken on the line 15—15 of Fig. 13;

Fig. 17 is a vertical sectional view taken on the line 17—17 of Fig. 16, and showing the operating means for the pad depositing mechanism;

Fig. 18 is a diagrammatic plan view similar to Fig. 1, but showing a modified arrangement of the means for feeding the strips of absorbent material and gauze respectively, and a modified form of pad conveying mechanism;

Fig. 19 is a diagrammatic view similar to Fig. 18, but showing a further modification of the pad conveying mechanism;

Figs. 20 and 21 are separated longitudinal sectional views showing a modified form of gauze feeding mechanism;

Fig. 22 is a vertical sectional view taken on the line 22—22 of Fig. 20, and showing a slightly modified form of pad conveyer belt and cooperating parts;

Fig. 23 is a transverse sectional view taken on the line 23—23 of Fig. 20;

Fig. 24 is a detailed view of the mechanism for delivering enveloped pads to the gauze severing mechanism illustrated in Fig. 21;

Fig. 25 is a perspective view of a sanitary napkin made by the improved machine disclosed herein; and Fig. 26 is a transverse sectional view of a napkin taken on the line 26—26 of Fig. 25.

Figure 16:
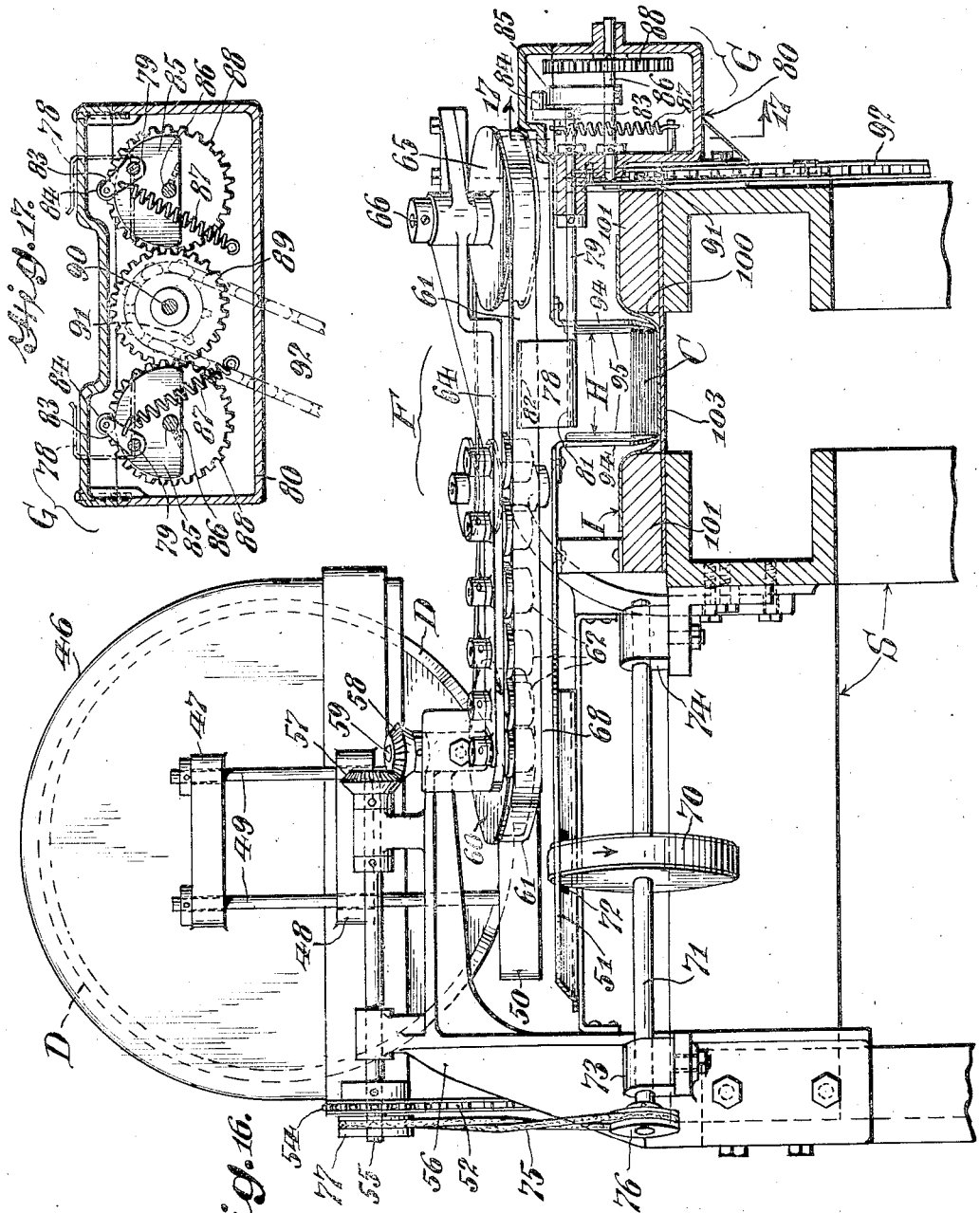
Fig. 16 is an enlarged vertical sectional view taken on the line 16—16 of Fig. 6, and showing the pad severing mechanism and the mechanism for conveying the severed pads to and depositing them upon the strip of gauze.

The mechanism of the present invention has been designed for the purpose of utilizing a strip of suitable absorbent material A intermittently fed from a roll of absorbent material B. From the forward end of the strip A pads C are severed by means of a continuously rotating cutter D operated by an electric motor E, the motor and cutter being so arranged as to reciprocate in a vertical direction to and from the strip. Upon being severed from the advancing end of the strip A, the pads C are delivered to a conveyer mechanism F which transports them to a depositing mechanism G by which they are delivered to alining means H supported above a strip of gauze I fed from a roll J continuously alongside the strip of absorbent material A and in a direction opposite to the direction of feed of the strip A. The strip of gauze I, with the pads C located at intervals thereon, is fed forwardly to a folding device K by means of which the edges of the strip are folded over the spaced pads C. The gauze strip, with the pads enfolded thereby, is then engaged by a gauze feeding mechanism L whereby it is delivered to the severing mechanism M which severs the folded gauze strip between the pads C, after which the gauze encased pads are deposited upon a conveyer N for removal from the machine in such manner as may be desired.

Power for operating the various mechanisms of the machine other than the continuously rotating cutter D is obtained from an electric motor O, the shaft P of which extends to a gear box Q from which the main drive shaft R of the machine extends. The various parts of the machine are carried by a suitable frame S.

In the construction herein illustrated, the roll of absorbent material B is supported in a suitable bin 1 carried by the frame S and having side walls and inclined bottom walls. The upper run of a feed belt 2 passing over one of the inclined bottom walls 3 operates to feed the strip of absorbent material A intermittently from the roll B. The belt 2 passes over a pair of rollers the lower one of which 4 is supported in suitable bearings in brackets 5 secured to the frame of the machine and the upper one of which 6 is also supported in suitable bearings in the frame and is intermittently driven by means of a sprocket chain 7 passing over a sprocket wheel 8 fixed to the shaft of the roller 6, also over a drive sprocket 9 on the extended end of a shaft 10 carrying a roller 11 for the feed belt for the strip of absorbent material A. The shaft 10 is supported in bearings in bracket arms 12 bolted or otherwise secured on the frame.

As the strip of absorbent material A is fed upwardly from the bin 1 by the belt 2 it is delivered to and fed forwardly by the opposing runs of an upper feed belt 13 and a lower feed belt 14. The upper belt 13 passes over idler rolls 15, 16 and an intermittently operated drive roll 17 which receives its motion through the intermittent mechanism 18 as shown in Figs. 8 and 10. The drive roll 17 is fixed upon a shaft 19 supported in bearings in the upper ends of brackets 20 suitably mounted on the machine frame, and one element of the intermittent mechanism 18 is fixed on one end of shaft 19 while the other element thereof is fixed on one end of a shaft 21 mounted below shaft 17 in bearings in the brackets 20. The shaft 21 is continuously driven by a sprocket chain 22 engaging a sprocket wheel 23 thereon and a sprocket wheel 24 on the main drive shaft R.

The lower feed belt 14 passes over idler rolls 25, 26 and the intermittently operated drive roll 11 on the shaft 10 heretofore referred to. The shaft 10 is driven by a sprocket chain 27 which engages a sprocket wheel 28 thereon, also a driven sprocket wheel 29 on shaft 19, and passes over an idler sprocket wheel 30 on stub shaft 31 supported in a suitable bracket on the frame.

As the strip of absorbent material A is thus fed forwardly over the bed plate 32 it is subjected to the operation of a pair of cutting dies 33 substantially triangular in cross section as shown in Figs. 13, 14 and 15. These dies are mounted upon and project downwardly from a supporting plate 34 of the pad cutting mechanism and cooperate with suitable die plates 35 supported upon the frame of the machine inwardly of the opposite edges of the strip of absorbent material A. The supporting plate 34 is mounted upon the upper ends of two pairs of guide bars 36 mounted for vertical reciprocation in hollow guide members 37 bolted or otherwise secured to the frame of the machine as shown in Figs. 14 and 15.

A cross head 38 is mounted upon the lower ends of the two pairs of reciprocating bars 36, and pivoted thereto and extending downwardly therefrom is a connecting rod 39 the lower end of which is connected to a crank 40 on a shaft 41 mounted in bearings in brackets 42 on the main frame S and continuously driven by means of a sprocket chain 43 in engagement with a sprocket wheel 44 thereon and a sprocket wheel 45 on the main drive shaft R.

The motor E by which the rotary cutter D is continuously operated is mounted upon the supporting plate 34. Fixed to the supporting plate 34 is a guard member 46 for the cutter D. Projecting from the guard member 46 is an elongated lug 47 having spaced openings extending therethrough in alinement with similar openings in an elongated lug 48 projecting outwardly from a portion of the supporting plate 34. These alined openings receive a pair of vertically movable rods 49 upon the lower ends of which a weighted presser foot 50 is mounted for the purpose of holding the forward end of the strip of aborbent material A as the pads C are severed therefrom by means of the rotating cutter D.

As will be seen from the above, the strip of absorbent material A is positively and intermittently advanced by the feed belts 13, 14 over the bed plate 32. The movements of feed mechanism for the strip of absorbent material A, and the reciprocating mechanism for the rotary cutter D and the cutting dies 33 are so timed that at the moment the strip of material A ceases to be advanced the rotary cutter D, the cutting dies 33, and the presser foot 50 are moved downwardly into contact with the strip. As the weighted presser foot 50 holds the extreme end of the strip of absorbent material A in position on the receiving end of the runway 51 of the conveyer mechanism F, the rotary knife D severs the end of the strip on the line of the V-shaped notches provided on opposite edges of the strip A upon the previous downward movement of the cutting dies 33.

As is shown in Fig. 13 of the drawings, the weighted presser foot 50 extends downwardly slightly below the lower edge of the rotary cutter D so that this presser foot comes in contact with the end of the strip of absorbent material A in order to hold the end of the strip in position upon the receiving end of the runway 51 as the end of the strip is severed by the rotary cutter. Inasmuch as the weighted presser foot is supported upon the lower end of the slidable rods 49, when the presser foot contacts with the strip of absorbent material A, further downward movement thereof ceases and it rests upon the upper face of the strip of absorbent material while the rotary cutter continues its downward movement and moves upwardly in the course of its reciprocating motion, whereupon the presser foot is lifted from the then severed absorbent pad C.

The rotary cutter D is so timed with respect to the feed mechanism for the strip of absorbent material A that when the cutter is lifted sufficiently high to raise the presser foot 50 out of contact with the pad C just severed from the advanced end of the strip A, the feeding mechanism operates to advance the strip and thus move the severed pad C forwardly on the runway 51 of the pad conveying mechanism F. At the same time, the pad conveying mechanism F is brought into operation by means of a sprocket chain 52 driven by a sprocket wheel 53 on the upper shaft 19 of the intermittent mechanism 18 and driving a sprocket wheel 54 fixed to the outer end of a shaft 55 mounted in suitable bearings in an overhanging arm 56 secured to the frame S of the machine. The inner end of the shaft 55 has fixed thereon a bevel gear 57 meshing with a bevel gear 58 on the upper end of a shaft 59 slightly inclined from the vertical and supported in a bearing on the inner end of the overhanging arm 56. Fixed to the lower end of the inclined shaft 59 is a drive pulley 60 about which the pad conveyer belt 61 passes. The operating portion of the conveyer belt is held in position by means of two sets of grooved guide pulleys 62 and 63, one of which is secured to the outer face of an arcuate guide arm 64 extending from immediately in front of the rotary cutter D over the advancing strip of gauze I. The conveyer belt 61 also passes over and is supported at the extreme end of its run by an idler pulley 65 mounted on the lower end of a stub shaft 66 having a bearing in the arcuate arm 56. The outer end of this arcuate guide arm 56 is supported by means of a suitable bracket 67 secured to the frame S of the machine.

The lower or operating edge 68 of the conveyer belt 61 is spaced from the runway 51 a distance slightly less than the normal thickness of the pads C so that the pads are slightly compressed when being transported over the runway by the belt. As illustrated in Figs. 1 to 4 of the drawings the conveyer belt 61 is circular in cross section. The belt may, however, be rectangular in cross section, as shown by the form of machine illustrated in Figs. 6 to 16, and the operating edge may be provided with serrations, or otherwise roughened as indicated at 69 in Fig. 22.

In order to assist in delivering the pads C to the conveyer belt 61 as they are severed from the forward end of the strip of absorbent material A, and in order to relieve the friction between the entering pad C and the runway 51, a friction wheel 70 is mounted below the runway 51 upon a shaft 71 so that its operating surface protrudes upwardly through an opening 72 in the runway. The shaft 71 is supported in a pair of bearing brackets 73, 74, adjustably mounted on the machine frame. The outer bracket 73 is preferably so mounted as to permit adjustment of the shaft 71 in a horizontal direction, and the inner bracket is so mounted as to permit adjustment of this shaft in a vertical direction, corresponding adjustments of the friction wheel 70 being thereby effected.

The shaft 71 is driven by means of a belt 75 passing over a pulley 76 fixed to the outer end thereof and over a pulley 77 fixed to the outer end of the shaft 55. Inasmuch as the shaft 55 is driven intermittently, intermittent rotary movement is likewise imparted to the shaft 71 carrying the friction wheel 72. As will also be noted, the friction wheel 72, the belt conveyer 61, and the feed mechanism for the strip of absorbent material A receive their intermittent motion from the same source.

It will be clear, therefore, from the various figures of the drawings, that when the pad severing mechanism moves upwardly in the course of its reciprocating movement, the pad conveying mechanism and the friction wheel are simultaneously set into operation. The advancing movement of the forward end of the strip of absorbent material A operates to push the previously severed absorbent pad C upon the protruding surface of the friction wheel 70, and thus the friction wheel operates to lift the forward edge of the moving pad from the surface of the runway 51 into engagement with the conveyer belt 61. This action of the friction wheel 70 therefore operates to relieve, to a great extent, the friction between the contacting surfaces of the pads C and the runway 51 and prevents the pads from being damaged by the conveyer belt 61 as they are delivered to the belt for movement across the runway 51. Upon each successive movement of the conveyer belt 61, the separate and spaced pads C are moved forwardly upon the runway 51 so that the position of each pad is changed from one at right angles to the moving strip of gauze I as it is delivered to the conveyer belt 61, to a position lengthwise of said strip at the discharge end of the runway 51.

As the pads C are moved to the discharge end of the runway 51 by the conveyer belt 61 they are delivered to the depositing mechanism G, by means of which the individual pads are positively delivered in spaced relation lengthwise of the continuously moving strip of gauze I. The depositing mechanism G comprises a pair of substantially U-shaped carrying members 78 mounted on the inner ends of a pair of oscillatable shafts 79 suitably supported in bearings formed in the inner side wall of a gear case 80 secured on the frame of the machine. The open ends of the U-shaped carrying members 78 are oppositely arranged with respect to each other, and the lower leg 81 of the members 78, particularly the member toward the end of the machine from which the gauze is fed, is somewhat longer than the upper leg 82, so that these carrying members may positively deposit the pads C, with the forward ends of the pads first, upon the moving strip of gauze I.

Fixed to the outer end of each of the shafts 79 is a crank arm 83 having a roller 84 on the outer end thereof for engagement with the cam surface of a semi-circular cam 85 adjustably fixed upon a shaft 86 having its opposite ends mounted in suitable bearings in the side walls of the gear case 80. A coiled spring 87 having one end secured to the crank arm 83 of each shaft and the opposite end secured to a stationary support in the gear case 80 operates to retain each of the rollers 84 in engagement with its respective semi-circular cam.

Fixed to each of the shafts 86 is a gear wheel 88 meshing with a gear 89 on an intermediate shaft 90 having its opposite ends mounted in suitable bearings in the side walls of the gear case 80. The inner end of the shaft 90 extends beyond the inner wall of the gear case and has fixed thereon a sprocket wheel 91 for engagement by a sprocket chain 92 which passes over a sprocket wheel 93 fixed to the extended end of the drive shaft 41.

Inasmuch as the main drive shaft R is rotated continuously, the gear wheels 88 and 89 within the gear box 80 are likewise rotated continuously so that the semi-circular cams 85 move the U-shaped carrying members 78 intermittently to deliver to the continuously moving strip of gauze I the individual pads C received thereby from the delivery end of the conveyer belt 61.

As will be apparent from Figs. 1, 12, 17 and 20 of the drawings, the depositing mechanism G is so constructed and is so related to the conveyer mechanism F that the pads C are delivered to the depositing mechanism by the conveyer mechanism with the ends of each pad resting upon the oppositely arranged supporting legs 81. When the shafts 79 are rocked to withdraw the legs 81 from beneath the ends of a pad supported thereon, the upper legs 82 turn with the shafts so that their free ends engage the pad before the legs 81 have been completely withdrawn, and positively discharge it from the legs 81. In view of the light, fluffy character of the pad material, such a positively acting depositing and discharging device has been found advantageous in insuring delivery of the pads at uniform intervals upon the strip of gauze.

As illustrated herein, the depositing mechanism G delivers the individual pads C to the alining mechanism H comprising a pair of oppositely arranged pad guiding and directing members 94 suitably supported above the strip of gauze I and having the forward ends 95 thereof converging as clearly shown in Figs. 1 and 6 of the drawings, and the carrying members 78 are preferably positioned between the guide members 94.

The strip of gauze I is fed forwardly from the roll J which is supported in suitable brackets 96 extending outwardly from the frame S of the machine. Preferably the roll J is provided with a brake device 97, such as illustrated in Figs. 8, 12 and 20 of the drawings, in order that overrunning of the roll J may be prevented as the gauze is withdrawn therefrom. The strip of gauze I, after passing over a series of idler rolls 98, passes over the tapering mouth 99 of a channel 100 provided between oppositely arranged channel-forming members 101 secured upon the frame of the machine. As shown in Figs. 6 and 16 of the drawings, the pad alining members 94 extend downwardly into the gauze channel 100 and the tapering lower edges 102 of the alining members operate to gradually press the gauze downwardly into this channel as it moves forwardly over the ends of the channel-forming members 101.

As shown in Figs. 16 and 22, the bottom of the gauze channel 100 is formed by a base plate 103 supported upon the frame S of the machine. The edges of the gauze strip I are maintained in contact with the upper faces of the channel-forming members 101 on opposite sides of the channel 100 by means of a pair of rollers 104 supported from a bracket member 105 extending upwardly from the machine frame. The rollers 104 are supported in hangers 105' which are angularly adjustable with respect to the strip of gauze and are retained in adjusted position by wing nuts 106, and the rollers are mounted for vertical movement in slotted bearings 107 as shown in Figs. 12 and 20.

Inasmuch as the oppositely arranged alining members 94 are located adjacent the delivery end of the runway 51 beneath the conveyer belt 61, the individual pads C are delivered to the continuously moving strip of gauze I in such a position as to rest upon the gauze in the bottom of the channel 100 in a direction lengthwise of the strip of gauze, and as the strip of gauze moves forwardly the pads are carried along therewith beneath a resilient retaining member 108 having one end mounted upon the bracket 109 extending transversely of the gauze channel 100 and supported from the machine frame, and its opposite end floating within the gauze channel. As the strip of gauze with the pads spaced in intervals thereon moves forwardly in the channel 100 the opposite edges of the strip encounter the folding device K comprising a pair of leaves 110 having their outer edges hinged to the channel-forming members 101. These folding members converge toward and overlap at one end of the folding device as clearly shown in Figs. 1 and 6 of the drawings, and operate in a manner well understood in the art.

Gauze tensioning rollers 111 are mounted upon the supporting brackets 109 and 112 above the folding members 110 for the purpose of retaining the edges of the gauze taut thereon. These rollers are similar to rollers 104 in structure and operation, and are angularly adjustable with respect to the strip of gauze in order to increase or decrease the outward tension on the edges of the gauze as may be desired, and they are mounted in slotted bearings as clearly shown in Figs. 12 and 20 in order to permit of vertical movement. An additional pressure roller 113 is mounted in a hanger 114 adjustably suspended from a bracket 115 supported upon the channel-forming members 101 for the purpose of retaining the upper fold of the gauze in position.

As will be understood from the showing in Figs. 1, 5 and 12 of the drawings, the strip of gauze I emerges from the folding device K with the pads C spaced at intervals thereon and with the opposite edges thereof folded over the upper faces of the pads C in overlapping relation with respect to each other. The strip of gauze thus folded about the pads is then delivered to the gauze feeding mechanism. This mechanism comprises essentially upper and lower endless belts 116 and 117 between the opposing runs of which the gauze enclosed pads are fed. The upper belt 116 passes around a drive roll 118 at one end and the opposite end thereof passes about an idler roll 119 mounted in bearings on the outer ends of arms 120 pivoted upon the shaft 121 of an idler roll 122 over which the upper run of the upper belt passes.

The lower belt 117 passes around a driving roll 123 fixed on a shaft 124 having the opposite ends thereof supported in bearings in brackets 125 upstanding from the frame S of the machine. The roll 123 is driven by means of a gear wheel 126 fixed to the shaft 124 thereof and meshing with a gear wheel 127 fixed to the shaft 128 of the roll 118 mounted thereabove in the brackets 125. The opposite end of the lower belt passes over an idler roll 129 having the opposite ends of its shaft 130 mounted in bearings in brackets 131 on the frame of the machine. The intermediate portion of the upper run of the lower belt 117 passes over an idler roll 132 on a shaft 133 having the opposite ends thereof mounted in bearings in a pair of brackets 134 extending upwardly from the machine frame and also supporting the shaft 121 of the roll 122.

Both the upper and lower gauze feed belts 116, 117 are continuously driven by means of a sprocket chain 135 passing over a sprocket wheel 136 fixed on the shaft 128 of the roll 118, also over a sprocket wheel 137 fixed on one end of an extended shaft 138 mounted in bearing brackets 139 on the machine frame. A second sprocket 140 on this shaft is engaged by a sprocket chain 141 passing over a sprocket wheel 142 on the main drive shaft R so that continuous movement is given to the gauze feed belts.

The shaft 138 has secured thereon a cutter blade 143 which at each rotation thereof is brought into shearing contact with a cooperating cutter blade 144 secured in a suitable manner to the machine frame. This cooperating cutter blade is located at the discharge end of the gauze feed belts 116, 117, and the rotary movement of the cutter blade 143 on the shaft 138 is so timed with respect to the speed of the gauze as to sever the folded strip of gauze between the successive pads enfolded thereby.

Upon being severed from the continuous strip of gauze by the cutter blade 143, the completed napkins are delivered to the conveyer N with the ends of the length of gauze envelope extending beyond the ends of the encased pad C as shown in Fig. 25. The conveyor N is arranged to deliver the napkins to any convenient location whereupon the extended ends of the gauze envelope are folded inwardly in overlapping relation upon the pad and the napkins are then packaged in any suitable manner.

In the embodiments of the invention heretofore referred to, the improvements have been described in connection with a form of machine in which the pads severed from the forward end of the advancing strip of absorbent material A are deposited upon a strip of gauze arranged alongside the strip of absorbent material and moving continuously in the opposite direction. In Fig. 18 there is disclosed a form of the machine in which the pads C are deposited upon a strip of gauze moving in the same direction as the strip of absorbent material. The pad conveying mechanism heretofore described is equally applicable to a machine of this character.

Fig. 19 discloses a slightly modified form of pad conveying mechanism. In the machine shown therein, the strip of gauze is moved continuously alongside the strip of absorbent material and in the same direction. The pad conveying mechanism, however, is so constructed as to move the pads C in the direction of their length over the runway 51' in order that they may be deposited upon and lengthwise of the strip of gauze. As illustrated in Fig. 19, the friction wheel 70' is arranged parallel to the rotary cutter D instead of substantially perpendicular thereto as shown in the modifications heretofore described. In this case, therefore, the friction wheel 70' operates to give to the pads C an initial movement in the direction of their length immediately after they are severed from the forward end of the strip of absorbent material. The pads are then engaged between the conveyer belt 61' and the runway 51' and move forwardly over the runway, in the direction of their length, and discharged through a suitable opening 145 in the runway upon the continuously moving gauze strip I.

In Figs. 20 and 21 a modified form of gauze feeding mechanism is disclosed in which the upper feed belt 116' does not differ materially from the feed belt 116 heretofore described. The lower feed belt 117', however, is arranged to extend substantially throughout the length of the machine beneath the gauze channel 100 upon the bed plate 103. Adjacent the tapering channel mouth 99 feed belt 117' passes over a roll 145, and the lower run of the belt is provided with a suitable tension roll 146. This belt is guided on the bed plate 103 in undercut grooves 147 in the channel-forming members 101. In this form of the invention the outer ends of the pivot arms 120' are limited in their movement in a downward direction by the engagement of the extended ends of the shaft or roll 119 or other suitable means with the open bearings 148 formed on the upper ends of the upstanding brackets 149. This construction limits the extent to which the roll 119 may move toward the roll 129, but permits the outer ends of pivot arms 120' to move upwardly away from the lower feed belt 117' in case an unusual thickness of material accumulates between the belts.

As disclosed in Figs. 20 and 22 of the drawings the pad conveyer belt 61a is rectangular in cross section and is provided with a longitudinally extending channel 150 which engages with cooperating flanges 151 on the guide pulleys 62'. This construction operates to retain the conveyer belt in proper position upon the guide pulleys.

Having thus described my invention, what I desire to claim by Letters Patent is:

1. In a machine for making sanitary napkins, the combination of means for feeding a continuous strip of absorbent material, means for transversely severing pads from the forward end of said strip of absorbent material, means for feeding a continuous strip of gauze in a direction opposite to the direction of feed of said strip of absorbent material and substantially parallel thereto, positively acting means for conveying said pads and depositing the same lengthwise of said strip of gauze and at intervals thereon, means for folding the edges of said strip of gauze about said pads, and means for severing said strip of gauze between the enfolded pads.

2. In a machine for making sanitary napkins, the combination of means for intermittently feeding a continuous strip of absorbent material, means for successively severing from the forward end of said strip of absorbent material pads extending transversely thereof, means for feeding a continuous strip of gauze in a direction opposite to the direction of feed of said strip of absorbent material and substantially parallel thereto, intermittently operating means for conveying said pads and depositing the same lengthwise of said strip of gauze and at intervals thereon, means for folding the edges of the strip of gauze about said pads, and means for severing the gauze between the enfolded pads.

3. In a machine for making sanitary napkins, the combination of means for feeding a continuous strip of absorbent material, means for transversely severing pads from the forward end of said strip of absorbent material, means for feeding a continuous strip of gauze in a direction opposite to the direction of feed of the strip of absorbent material and substantially parallel thereto, means for conveying said pads to a position over and lengthwise of said strip of gauze, and positively acting means for depositing said pads upon said strip of gauze.

4. In a machine for making sanitary napkins, the combination of means for feeding a continuous strip of gauze in a given direction, means for conveying elongated pads of absorbent material from a position alongside of said strip and arranged transversely thereof to a position over said strip and arranged lengthwise thereof, and means for depositing said pads upon said strip at spaced intervals lengthwise thereof.

5. In a machine for making sanitary napkins, the combination of means for continuously moving a strip of gauze in a given direction, means for providing elongated pads of absorbent material alongside of and extending transversely of said strip, means for conveying said pads and arranging the same lengthwise of said strip and over the same, and intermittently operating means for vertically depositing said pads on said strip.

6. In a machine for making sanitary napkins, the combination of means for moving a strip of gauze in a given direction, oppositely arranged guide members supported over said strip and converging in the direction of movement thereof, and positively acting means positioned between said guide members for vertically depositing elongated pads of absorbent material at spaced intervals on said strip.

7. In a machine for making sanitary napkins, the combination of means for continuously moving a strip of gauze in a given direction, oppositely arranged guide members supported over said strip and converging in the direction of movement thereof, intermittently operating means for vertically depositing elongated pads of absorbent material singly on said strip between said guide members, and means for conveying said pads from a position adjacent said strip and delivering the same to said intermittently operating means.

8. In a machine for making sanitary napkins, the combination of means for intermittently feeding a strip of absorbent material in a given direction, means for intermittently severing the forward end of said strip of material transversely thereof to form elongated pads, means for continuously feeding a strip of gauze alongside said strip of absorbent material and in the opposite direction, and intermittently operating means for conveying said pads and depositing the same at spaced intervals lengthwise of said gauze, including a runway for said pads between the forward end of said strip of material and said strip of gauze, a conveyer belt mounted above said runway for frictionally engaging said pads, and a guideway for said belt.

9. In a machine for making sanitary napkins, the combination of means for intermittently feeding a strip of absorbent material in a given direction, means for intermittently severing the forward end of said strip of material transversely thereof to form elongated pads, means for continuously feeding a strip of gauze alongside of said strip of absorbent material and in the opposite direction, and intermittently operating means for conveying said pads and depositing the same at spaced intervals lengthwise of said gauze, comprising a runway for said pads between the forward end of said strip of material and said strip of gauze, a conveyer belt mounted above said runway for frictionally engaging said pads, and means at the discharge end of said runway for transferring said pads to said strip of gauze.

10. In a machine for making sanitary napkins, pad conveying mechanism comprising a runway, a conveyer belt mounted above said runway for frictionally engaging the pads, means for guiding said belt to convey said pads on said runway from one position to another position at right angles thereto, and means for intermittently moving said belt.

11. In a machine for making sanitary napkins, pad conveying mechanism comprising a runway, a conveyer belt mounted above said runway for frictionally engaging the pads, means for guiding said belt to convey said pads on said runway from one position to another position at right angles thereto, and means for relieving the friction between the pads and the runway at the receiving end of said belt.

12. In conveying mechanism for absorbent pads and the like, a runway for the pads, a conveyer belt mounted above the runway for frictionally engaging the pads and moving the same along said runway, means for delivering the pads to the receiving end of said runway, means for moving said belt, and means for raising the pads from said runway into engagement with said belt upon the delivery of the pads to the runway.

13. In conveying mechanism for absorbent pads and the like, a runway for the pads, a conveyer belt mounted above the runway for frictionally engaging the pads and moving the same along the runway, means for delivering the pads to the receiving end of said runway, means for intermittently moving said belt, and means for relieving the friction between said pads and said runway and bringing said pads into engagement with said belt at the receiving end thereof.

14. In conveying mechanism for absorbent pads and the like, a runway for the pads, a conveyer belt mounted above the runway for frictionally engaging the pads and moving the same along the runway, means for delivering the pads to the receiving end of said runway, means for intermittently moving said belt, a friction wheel mounted at the receiving end of said runway and extending upwardly therethrough to deliver the pads to said belt, and means for moving said wheel in timed relation to said belt.

15. In conveying mechanism for absorbent pads and the like, a runway for the pads, a guide arm mounted thereabove, a plurality of guide rollers mounted in an arcuate path on said arm, a conveyer belt mounted on said guide rollers with its lower edge spaced from said runway for frictionally engaging the pads and conveying the same along said runway, means for delivering the pads to the receiving end of said belt, and means for intermittently moving said belt.

16. In a machine for making sanitary napkins, the combination of means for continuously feeding a strip of gauze in a given direction, intermittently operated means for conveying elongated pads of absorbent material into a position lengthwise of and above said strip, and means for receiving said pads from said intermittently operated means and depositing them in spaced relation on said strip, comprising oppositely arranged supports for the ends of the pads, means for discharging the pads from the supports, and intermittently operated mechanism for withdrawing said supports from the ends of the pads and actuating the means for discharging the pads.

17. In a machine for making sanitary napkins, the combination of means for continuously feeding a strip of gauze in a given direction, and a device for depositing pads of absorbent material in spaced relation on said strip, comprising supports for the opposite ends of the pads, means for positively discharging the pads from the supports, and intermittently operated mechanism for withdrawing the supports from beneath the pads and actuating the means for discharging the pads from the supports.

18. In a machine for making sanitary napkins, the combination of means for continuously feeding a strip of gauze in a given direction, a conveyer mechanism for transferring elongated pads of absorbent material to a position lengthwise of and over said strip, guiding means supported adjacent said strip for alining the pads deposited thereon, and intermittently operated means for receiving said pads from said conveyer mechanism and vertically depositing the same in said guiding means.

19. In a machine of the class described, mechanism for transferring pads of absorbent material and depositing the same at intervals upon a moving strip of fabric wrapper, comprising a runway for the pads, a conveyer belt having the operating run thereof arranged above said runway and spaced therefrom to frictionally engage the pads and transport them across said runway, a friction wheel protruding through said runway adjacent the receiving end of said belt to deliver the pads to said belt, supporting means for the ends of the pads adjacent the discharge end of said belt, means for withdrawing said supporting means from the pads, and means for discharging the pads from said supporting means.

20. In a machine of the class described, mechanism for receiving pads of absorbent material and depositing the same at intervals upon a strip of fabric wrapper, comprising a pair of spaced oscillatory shafts, a pair of supports mounted on said shafts and normally extending inwardly toward each other to engage beneath the ends of the pads delivered thereto, means for oscillating said shafts to withdraw said supports from said pads, means for positively discharging the pads from said supports, and means for returning the supports to their normal position.

AUGUST P. JURGENSEN.